United States Patent
Gretz (10) Patent No.: US 7,319,192 B1
(45) Date of Patent: Jan. 15, 2008

(54) FRAME MEMBER AND BOX COMBINATION FOR RECESSING AN ELECTRICAL BOX AND COVER ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/641,210

(22) Filed: Dec. 19, 2006

(51) Int. Cl.
*H01H 9/02* (2006.01)

(52) U.S. Cl. ............................ 174/58; 174/57; 174/50; 174/63; 220/4.02; 249/906

(58) Field of Classification Search ................. 174/58, 174/57, 63, 50, 60, 135, 481, 480, 502; 220/3.2, 220/3.8, 4.02; 248/906; 439/535
See application file for complete search history.

(56) References Cited

U.S. PATENT DOCUMENTS

| | | | | |
|---|---|---|---|---|
| 4,265,365 A | * | 5/1981 | Boteler | 220/3.3 |
| 5,775,032 A | * | 7/1998 | Lacy | 52/28 |
| 5,920,033 A | * | 7/1999 | Bosse, Jr. | 174/481 |
| 6,028,268 A | * | 2/2000 | Stark et al. | 174/67 |
| 6,723,921 B2 | * | 4/2004 | Vagedes | 174/58 |
| 7,115,820 B1 | * | 10/2006 | Gretz | 174/481 |
| 7,183,483 B1 | * | 2/2007 | Anderson et al. | 174/50 |
| 7,214,877 B2 | * | 5/2007 | de la Borbolla | 174/58 |
| 7,259,328 B1 | * | 8/2007 | Gretz | 174/57 |
| 7,265,292 B2 | * | 9/2007 | Greenfield | 174/67 |

* cited by examiner

*Primary Examiner*—Dhiru R. Patel (57) ABSTRACT

An electrical box assembly including a frame member and an outlet box assembly with an outlet box and a hinged cover. The frame member includes a peripheral flange and inward sloping sidewalls that extend to a rear panel having a central opening therein. The outlet box includes a flange and a rearward extending sidewall portion. The frame member can be secured to a wall and the rearward extending sidewall of the outlet box inserted into the central opening of the frame member until the flange of the outlet box seats against the rear panel of the frame member. The rear panel of the frame member is recessed a substantial distance from the front edge of the frame member, thereby ensuring that the outlet box assembly and hinged cover in a closed configuration will be recessed within the outer surface of the wall.

14 Claims, 13 Drawing Sheets

FRAME MEMBER AND BOX COMBINATION FOR RECESSING AN ELECTRICAL BOX AND COVER ASSEMBLY

FIELD OF THE INVENTION

This invention relates to electrical boxes and specifically to a frame member and outlet box combination for mounting the outlet box and its cover flush with or recessed from the wall of a building.

BACKGROUND OF THE INVENTION

Conventional exterior electrical boxes for the mounting of duplex outlets, switches, and other electrical devices are typically installed essentially flush with the wall surface. The exterior electrical boxes usually include a hinged cover to cover the electrical device. Typically the hinged cover extends outward from the front of the electrical box and therefore also extends outward of the wall. Some types of conventional electrical box covers, known as bubble covers, extend a substantial amount from the wall surface.

Outward-extending electrical box and cover assemblies, though they cover the front of the box, are prone to damage by lawnmowers, vehicles, and other hazards as a result of the cover member extending substantially beyond the outer wall surface.

What is needed therefore is a device for mounting an electrical box in a manner that the electrical box and its cover are flush with or recessed from the outer wall surface. The box and cover member in the closed position are therefore protected against any accidental contact by lawn equipment, vehicles, or other hazards.

SUMMARY OF THE INVENTION

The invention is an electrical box assembly including a frame member and an outlet box assembly having an outlet box and a hinged cover. The frame member includes a peripheral flange and inward sloping sidewalls that extend to a rear panel having a central opening therein. The outlet box includes a flange and a rearward extending sidewall portion. The frame member can be secured to a wall and the rearward extending sidewall of the outlet box inserted into the central opening of the frame member until the flange of the outlet box seats against the rear panel of the frame member. The panel of the frame member is recessed a substantial distance from the front edge of the frame member, thereby ensuring that the outlet box assembly and hinged cover in a closed configuration will be flush with or recessed within the outer surface of the wall.

OBJECTS AND ADVANTAGES

Several advantages are achieved with the frame member and electrical box combination of the present invention, including:

(1) The frame member recesses the electrical box and cover flush with or within the outer wall surface thereby protecting the box and cover assembly from dings and nicks.

(2) In a stucco version of the frame member, a forward extending wall on the frame member provides a screed line for evenly applying stucco around the frame member.

(3) In a stucco version of the frame member, a flange extending laterally from the periphery of the frame member includes a perforated surface for enhancing stucco adhesion to the frame member.

(4) A further advantage is that the frame member and electrical box combination provides a first enclosure that positions the electrical device within the exterior wall, thereby shielding the electrical device from impacts, and a second enclosure for shielding the electrical device from rain and other environmental elements.

(5) The current frame member and electrical box combination provides, when used to house a duplex outlet, an electrical box and a spacious protective enclosure for protecting the plug ends of electrical cords.

These and other objects and advantages of the present invention will be better understood by reading the following description along with reference to the drawings.

TABLE OF NOMENCLATURE

The following is a listing of part numbers used in the drawings along with a brief description:

| Part Number | Description |
| --- | --- |
| 20 | electrical box mounting assembly |
| 22 | frame member, preferred embodiment |
| 23 | outlet box assembly |
| 24 | outlet box |
| 26 | hinged cover |
| 28 | sidewalls of frame member |
| 30 | peripheral flange of frame member |
| 32 | panel |
| 34 | central opening |
| 36 | aperture in panel |
| 38 | opening in peripheral flange |
| 40 | slot in peripheral flange |
| 42 | corner of peripheral flange |
| 44 | rear end of sidewalls |
| 46 | first sidewall portion |
| 48 | planar front edge of first sidewall portion |
| 50 | second sidewall portion |
| 52 | peripheral sidewalls of outlet box |
| 54 | flange of outlet box |
| 56 | front sidewall portion of outlet box |
| 57 | front edge of outlet box |
| 58 | rear sidewall portion of outlet box |
| 60 | fastener |
| 61 | substrate |
| 62 | fastening arrangement |
| 64 | aperture in outlet box flange |
| 65 | fastener |
| 68 | plane through front edge of frame member |
| 70 | first U-shaped slot in outlet box |
| 72 | post |
| 73 | knockout |
| 74 | peripheral wall of cover |
| 76 | aperture in cover |
| 78 | ear |
| 80 | edge of peripheral wall |
| 82 | second U-shaped slot in cover |
| 84 | circular cord opening |
| 86 | stucco |
| 88 | outer surface of wall |
| 90 | inner surface of first sidewall portion |
| 92 | third sidewall portion |
| 100 | frame member, second embodiment |
| 102 | front edge |
| 104 | second flange |
| 106 | outer wall |
| 108 | rear edge of outer wall |
| 109 | peripheral flange |
| 110 | arm |
| 112 | back side of arm |
| 114 | channel |
| 116 | slot |
| 118 | siding |
| 120 | caulk |
| 122 | edge of second flange and siding |
| D1 | depth from panel to front edge of frame member |
| D2 | depth of outlet box assembly from the back side of the flange to the front side of the cover |
| θ | angle of sidewalls of frame member with respect to the front edge |

DETAILED DESCRIPTION OF THE INVENTION

The present invention comprises an electrical box assembly for securing an electrical device to the exterior wall of a building. The electrical box assembly enables mounting a covered outlet box to the wall in such a manner that the cover and box are either flush or recessed within the surface of the wall.

Figure 9:
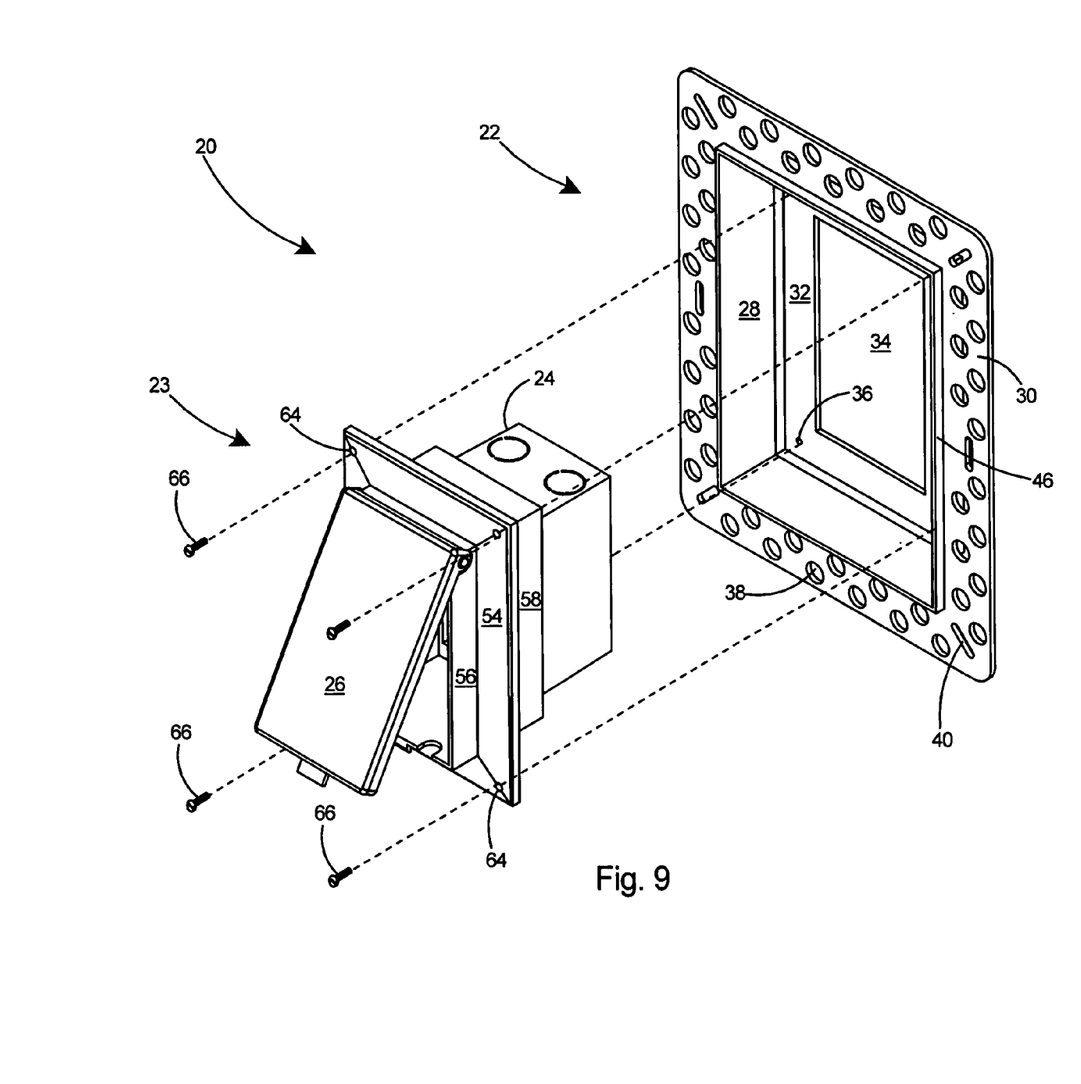
FIG. 9 is a perspective view of a covered electrical box in alignment with the preferred embodiment of the frame member.
Figure 10:
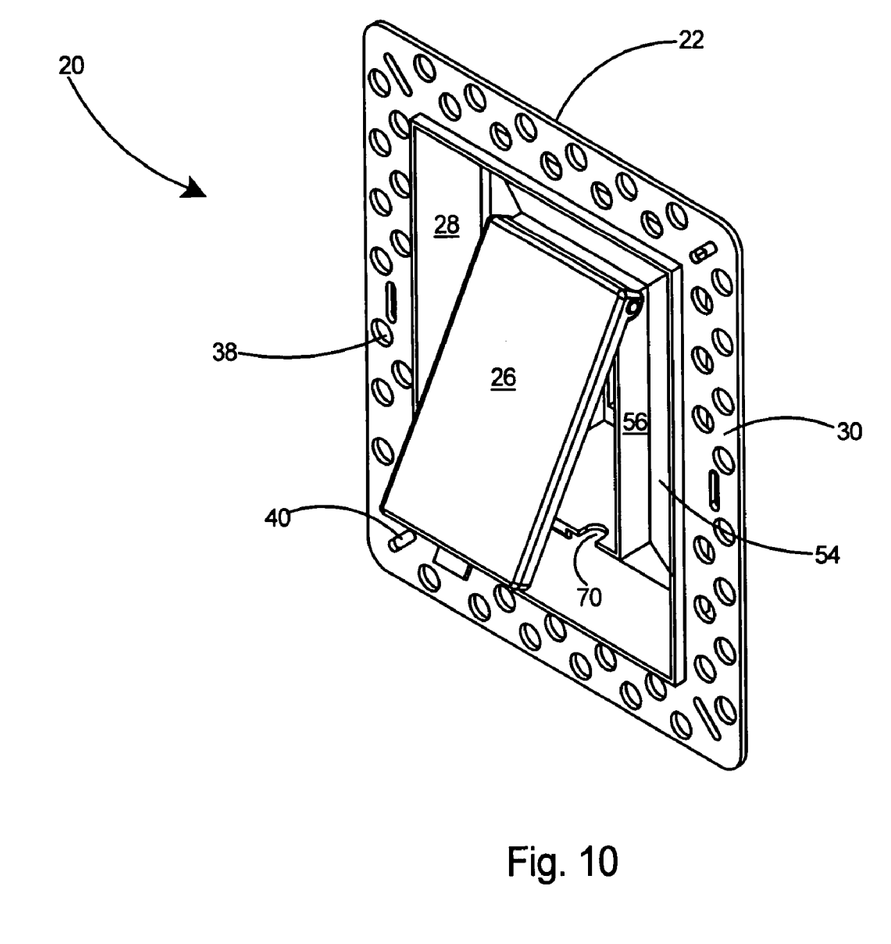
FIG. 10 is a perspective view of a covered electrical box secured to a frame member according to the present invention.

With reference to FIG. 9 there is shown a preferred embodiment of the electrical box mounting assembly 20 including a frame member 22, and an outlet box assembly 23 including an outlet box 24 and a hinged cover 26.

Figure 1:
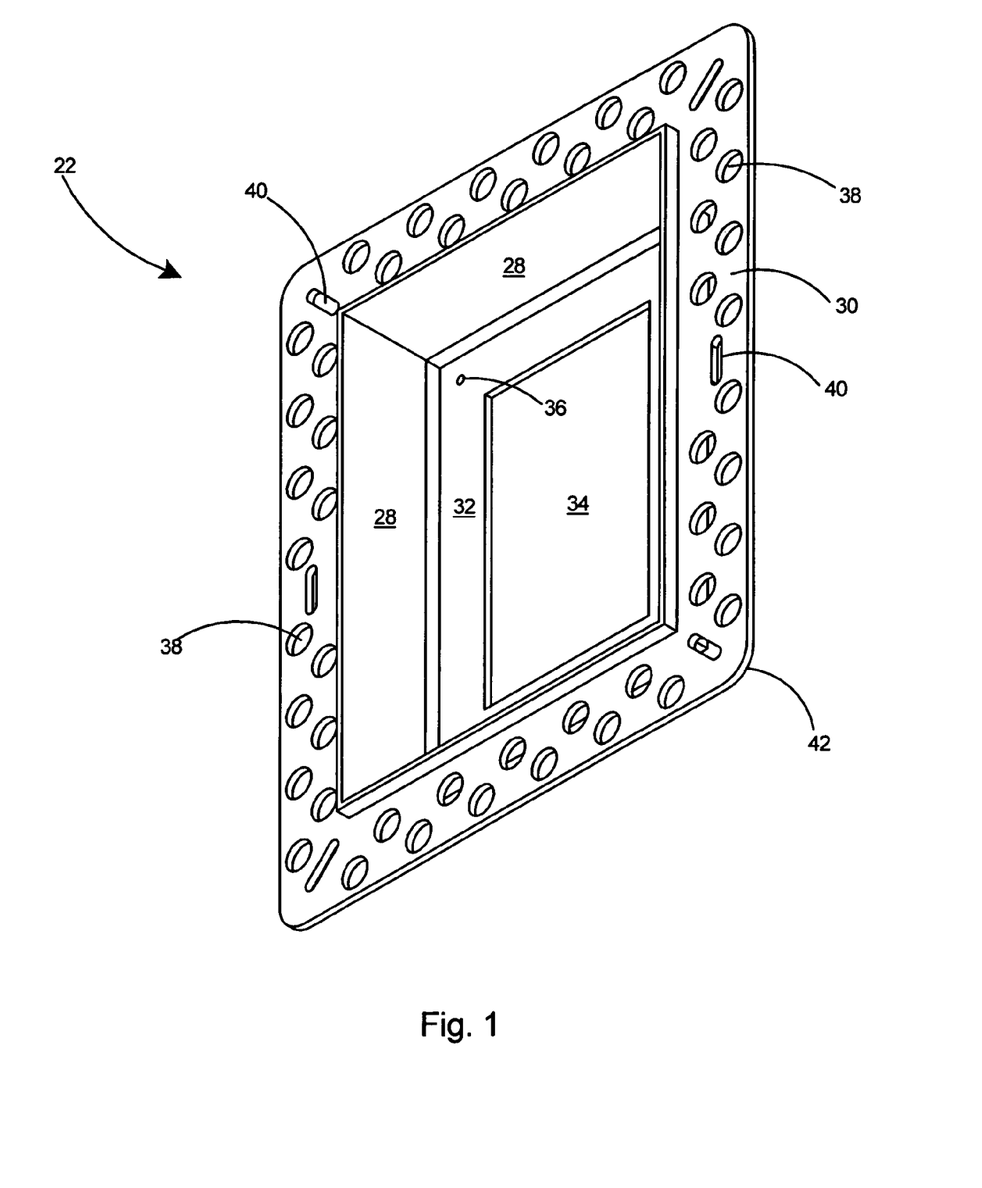
FIG. 1 is a perspective view of a preferred embodiment of a frame member that forms a portion of a frame member and electrical box combination according to the present invention.
Figure 2:
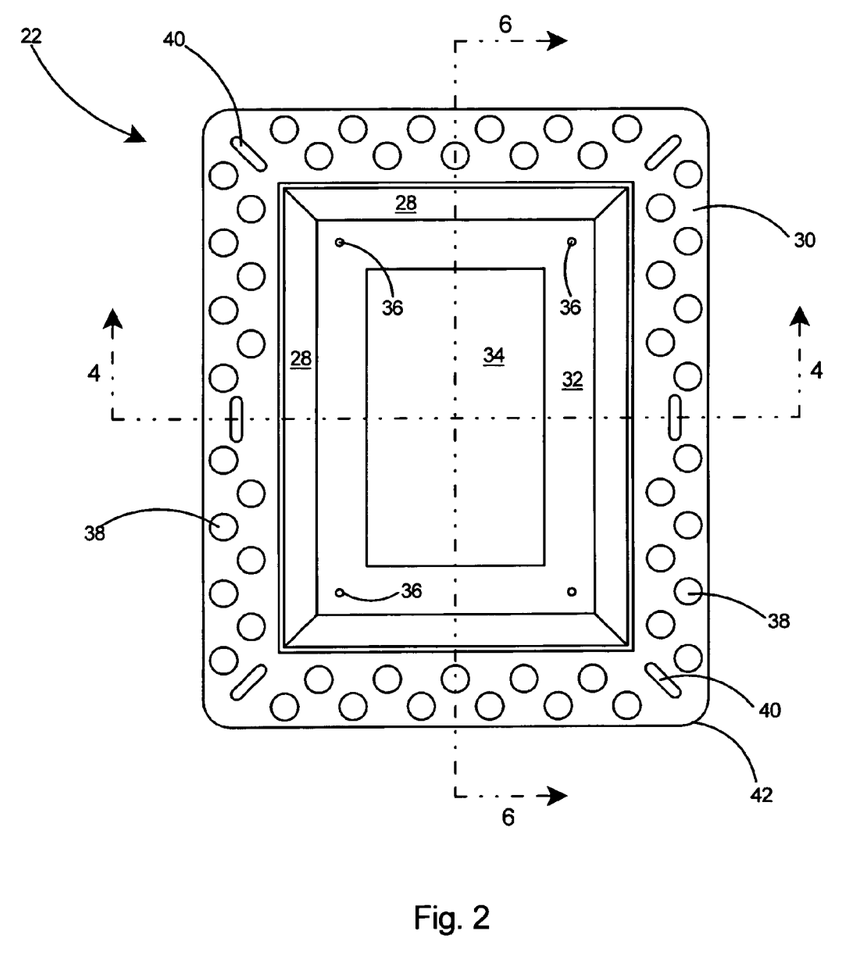
FIG. 2 is a front view of the frame member of FIG. 1.
Figure 3:
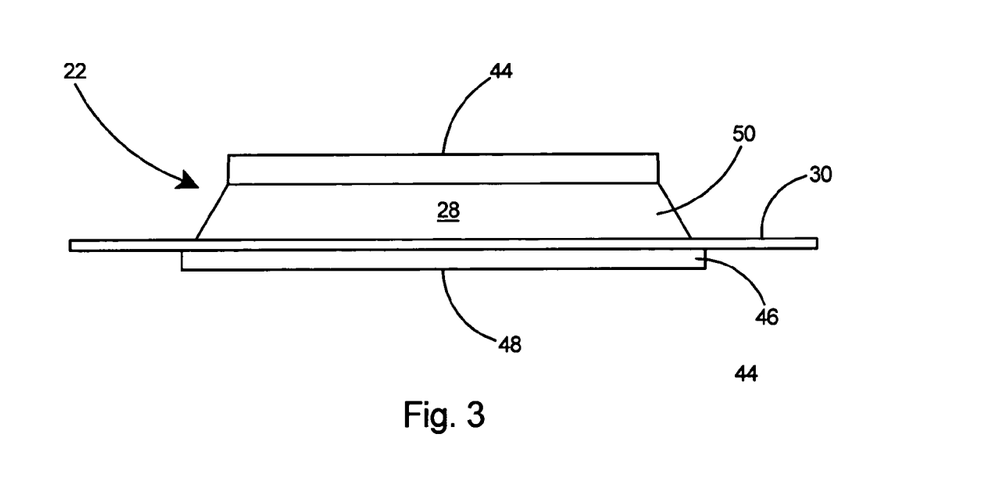
FIG. 3 is a top view of the frame member of FIG. 2.
Figure 4:
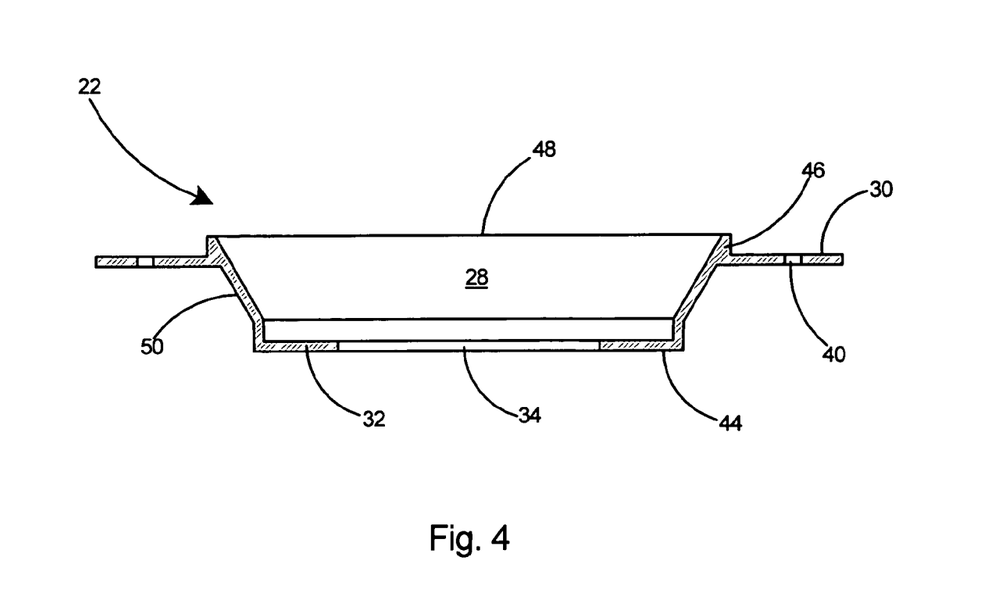
FIG. 4 is a sectional view of the frame member taken along line 4-4 of FIG. 2.
Figure 5:
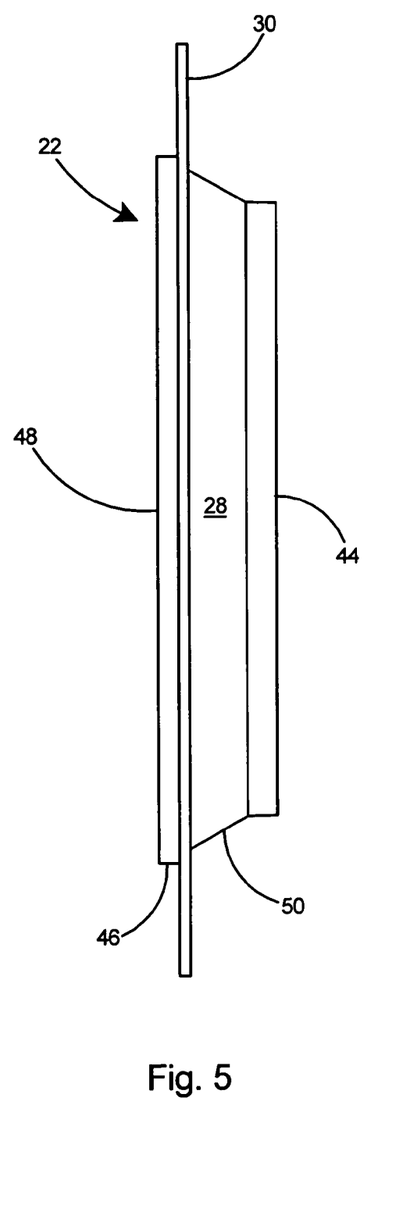
FIG. 5 is a side view of the frame member of FIG. 2.

As shown in FIGS. 1 and 2, the preferred embodiment of the frame member 22 includes sidewalls 28, an outward extending peripheral flange 30, a panel 32, and a central opening 34. Apertures 36 are provided in the panel 32 of the frame member 22. The peripheral flange 30 of the frame member 22 includes a plurality of openings 38 and slots 40 therein. The peripheral flange 30 includes four corners 42 each and a slot 40 in each of the corners.

Referring to FIGS. 3-6, sidewalls 28 of the frame member 22 include a rear end 44 with the panel 32 extending orthogonally inward from the rear end 44 of the sidewalls 28. The sidewalls 28 include a first sidewall portion 46 extending forward from the peripheral flange 30 to a planar front edge 48. A second sidewall portion 50 extends rearward from the peripheral flange 30 to the rear end 44. Preferably the sidewalls 28 are sloped inwards and extend at an angle θ (see FIG. 6) of between 50 and 70 degrees with respect to the front edge 48.

Figure 7:
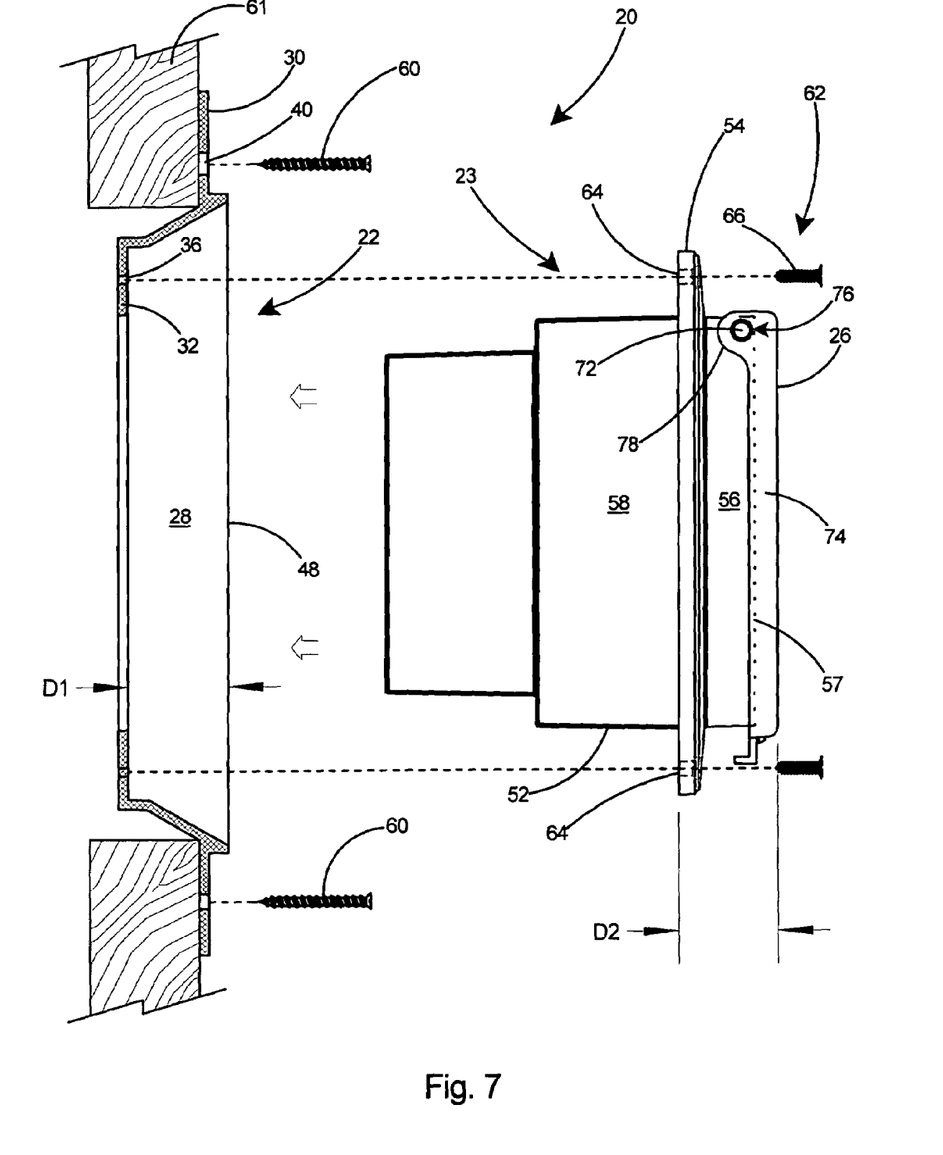
FIG. 7 is a side view of a covered electrical box in alignment with the preferred embodiment of the frame member to which it will be secured to form the electrical box mounting assembly of the present invention.

With reference to FIG. 7 there is shown a side view of the outlet box assembly 23 in alignment with a frame member 22 to which it will be secured to form the electrical box mounting assembly 20 of the present invention. The outlet box assembly 23 includes peripheral sidewalls 52 and a flange 54 extending outwardly from the sidewalls 52. The outlet box assembly 23 includes a front sidewall portion 56 extending forward from the flange 54 to a front edge 57 and a rear sidewall portion 58 extending rearward from the flange 54. Fasteners 60 are inserted through the slots 40 in the peripheral flange 30 to secure the frame member 22 to the substrate 61. A fastening arrangement 62 for securing the outlet box assembly 23 to the frame member 22 includes apertures 64 in the flange 54 and fasteners 66 for securing through the apertures 64 of the outlet box assembly 23 and into the apertures 36 in the panel 32 of the frame member 22.

A primary objective of the present invention is to provide a mounting assembly that will mount an electrical box and its closed cover below the surface of the wall. The present invention accomplishes that by providing a frame member 22 with a depth from the panel 32 to the front edge 48, distance D1 in FIG. 7, that is greater than the distance D2 between the back side of flange 54 and front side of the cover 26 of the outlet box assembly 23 with the cover 26 in a closed configuration. Thus the entire outlet box assembly 23 will be situated within the outer front edge 48 of the frame member 22 and therefore protected from damage by lawn equipment and similar hazards.

Figure 8:
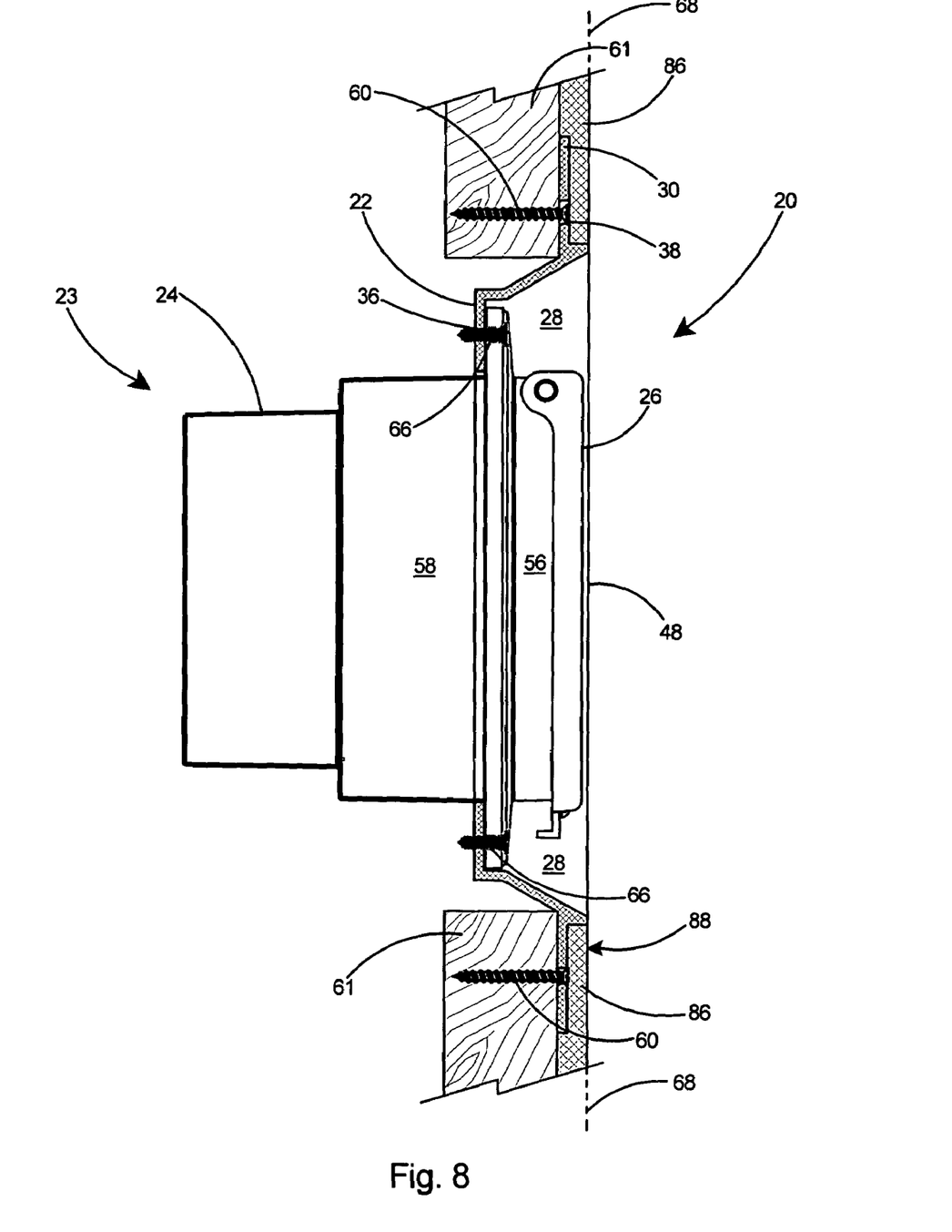
FIG. 8 is a side view of a covered electrical box secured to a frame member.

After the frame member 22 is secured to the substrate 61 and the outlet box assembly 23 is secured to the frame member 22 as shown in FIG. 8, the flange 54 of the 15' outlet box 24 is flush against the panel 32 of the frame member 22. The hinged cover 26 of the outlet box assembly 23, when it is in the closed configuration as shown in FIG. 8, and the front sidewall portion 56 of the outlet box assembly 23 do not extend beyond the plane 68 (dashed line) defined by the planar front edge 48 of the frame member 22.

Figures 11, 12, 13:
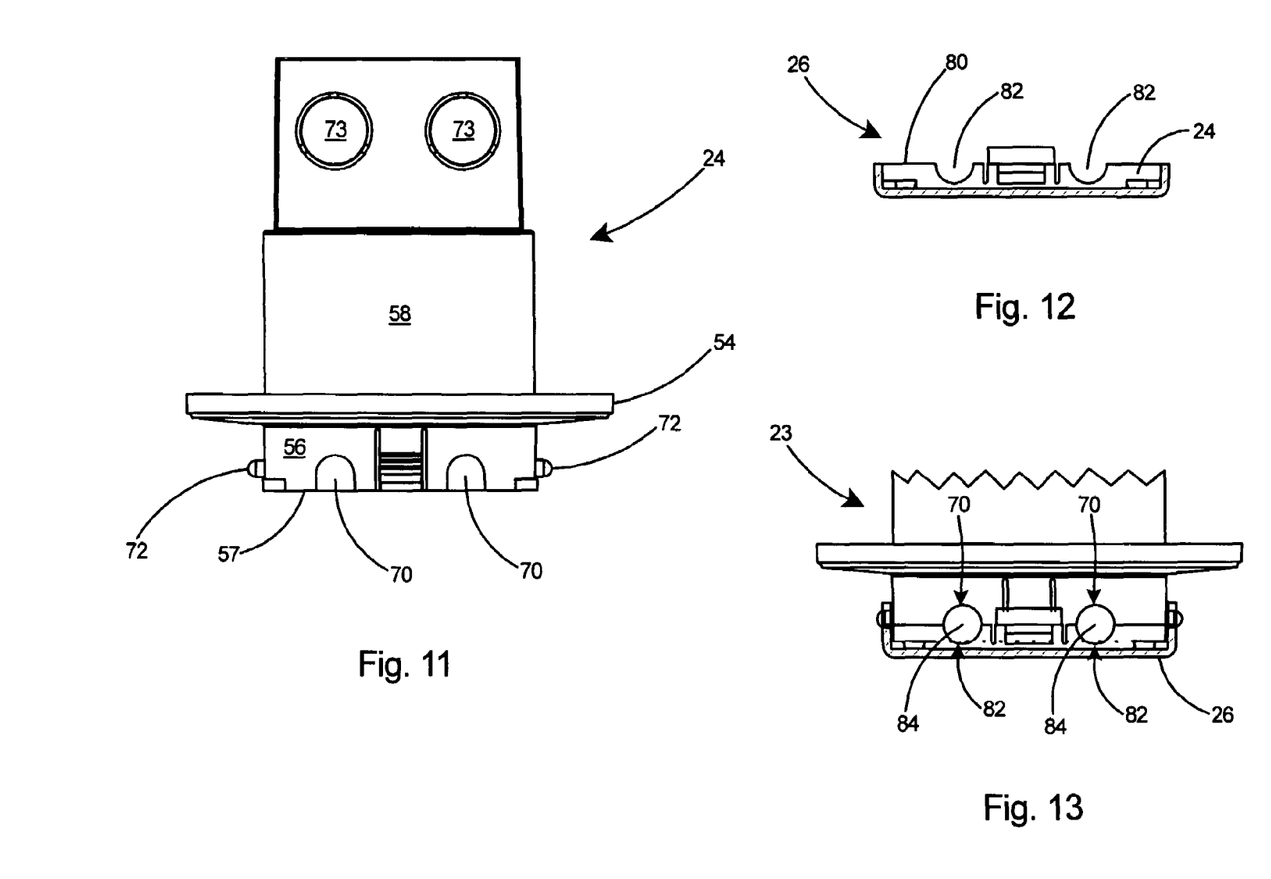
FIG. 11 is a bottom view of an electrical box according to the present invention.
FIG. 12 is a bottom view of a cover member according to the present invention.
FIG. 13 is a bottom view of the cover member of FIG. 12 in a closed configuration on the electrical box of FIG. 11.

As shown in FIG. 11, the front sidewall portion 56 of the outlet box assembly 23 includes first U-shaped slots 70 extending inward from the front edge 57 and posts 72 extending outward from the front sidewall portion 56. Knockouts 73 are provided in the rear sidewall portion 58 of the outlet box 24.

As shown in FIG. 7, the cover 26 includes a peripheral wall 74 with apertures 76 therein in ears 78 extending from the peripheral wall 74. The cover 26 is hinged to the outlet box assembly 23 by the posts 72 extending through the apertures 76 in the cover 26. The hinged cover 26 therefore is capable of rotating from a closed configuration as shown in FIG. 7 to an open configuration.

With reference to FIG. 12, the peripheral wall 74 of the cover member 26 includes an edge 80 and second U-shaped slots 82 extending inward from the edge 80 into the peripheral wall 74. The cover 26, when placed in the closed configuration as shown in FIG. 13, includes circular cord openings 84 formed by the first U-shaped slots 70 of the outlet box assembly 23 in alignment with the second U-shaped slots 82 of the cover 26.

After the frame member 22 and outlet box assembly 23 are secured to the substrate 61, as shown in FIG. 8, stucco 86 is applied over the peripheral flange 30 of the frame member 22. After the stucco 86 is applied, the outlet box 24 and cover 26 are recessed within the outer surface 88 of the wall. The openings 38 in the peripheral flange 30 of the frame member 22 promote adherence of the stucco 86 to the peripheral flange.

Figure 6:
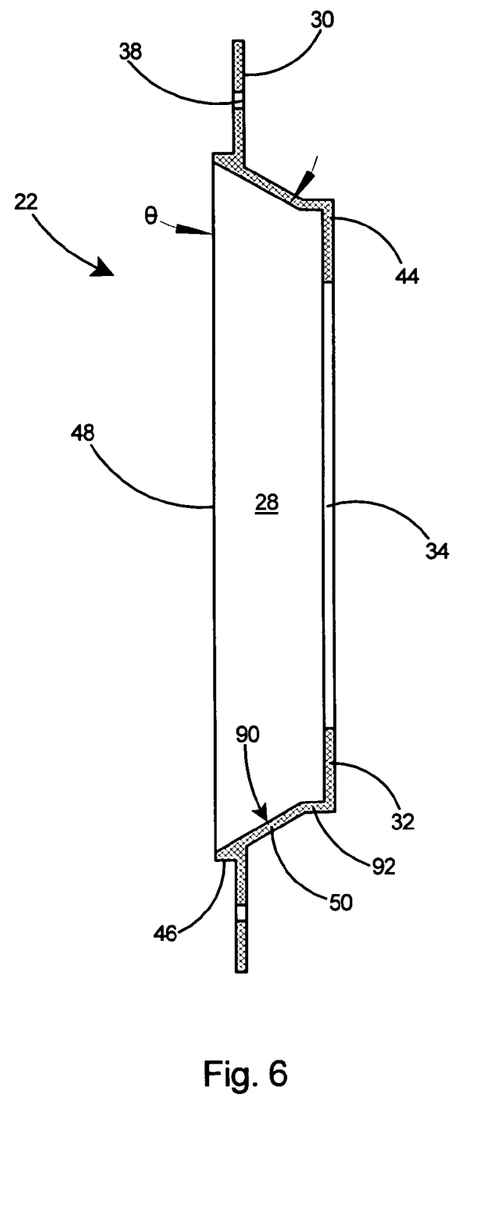
FIG. 6 is a sectional view of the frame member taken along line 6-6 of FIG. 2.

As shown in FIG. 6, the sidewalls 28 of the frame member 22 are generally sloped inwards and extend at an angle θ with respect to the planar front edge 48. As shown at the lower end of the figure, the inner surface 90 of first sidewall portion 46 and a major portion of the second sidewall portion 50 are sloped inward at a constant slope. A third sidewall portion 92 is orthogonal to the front edge 48 and orthogonal to the panel 32.

Preferably the frame member 22, the outlet box 24, and the cover member 26 of the present invention are each molded in one-piece of plastic.

Figure 14:
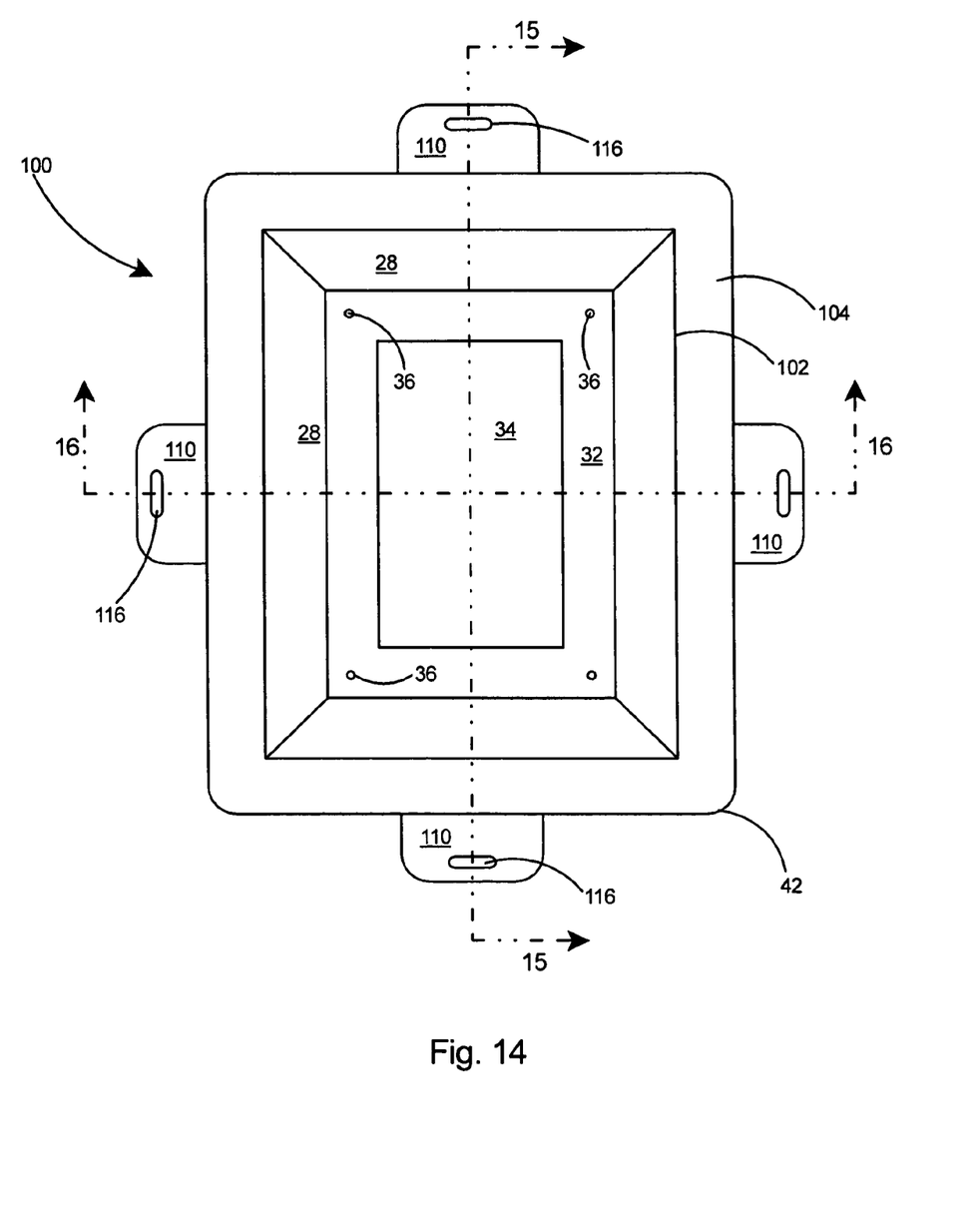
FIG. 14 is a front view of a second embodiment of a frame member according to the present invention.

Referring to FIG. 14 there is shown a second embodiment of a frame member 100 according to the present invention. The second embodiment of the frame member 100 is for use on a structure that will be covered with siding rather than stucco. Similar to the first embodiment, the second embodiment of the frame member 100 includes sidewalls 28, a panel 32 having apertures 36 therein, and a central opening 34.

Figure 15:
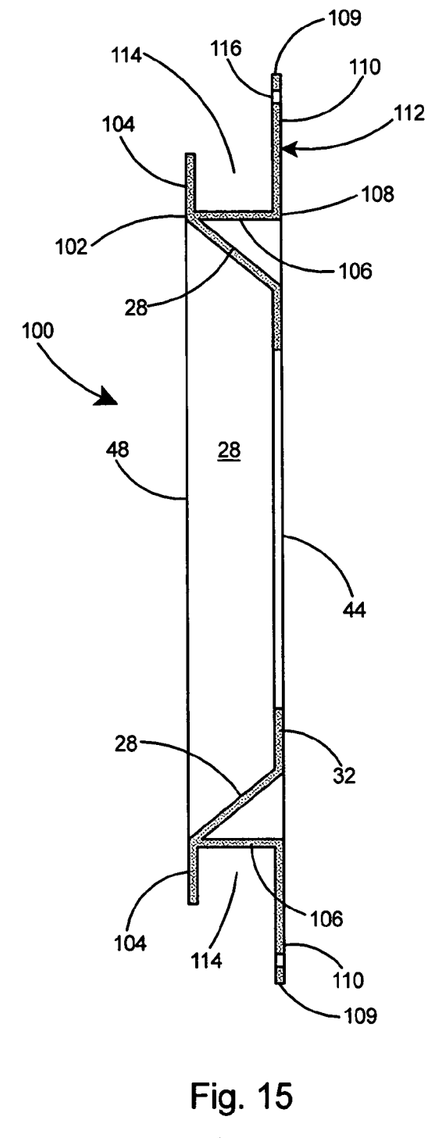
FIG. 15 is a sectional view of the frame member taken along line 15-15 of FIG. 14.
Figure 16:
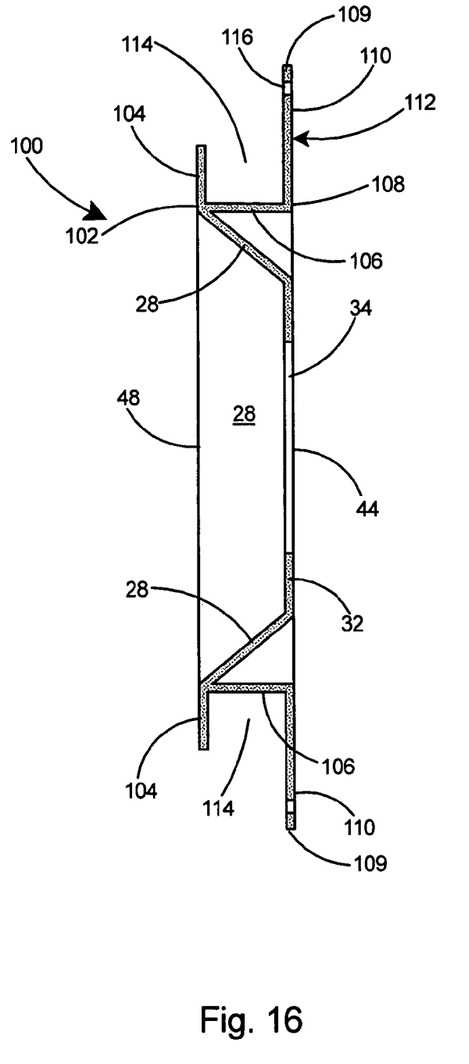
FIG. 16 is a sectional view of the frame member taken along line 16-16 of FIG. 14.
Figure 17:
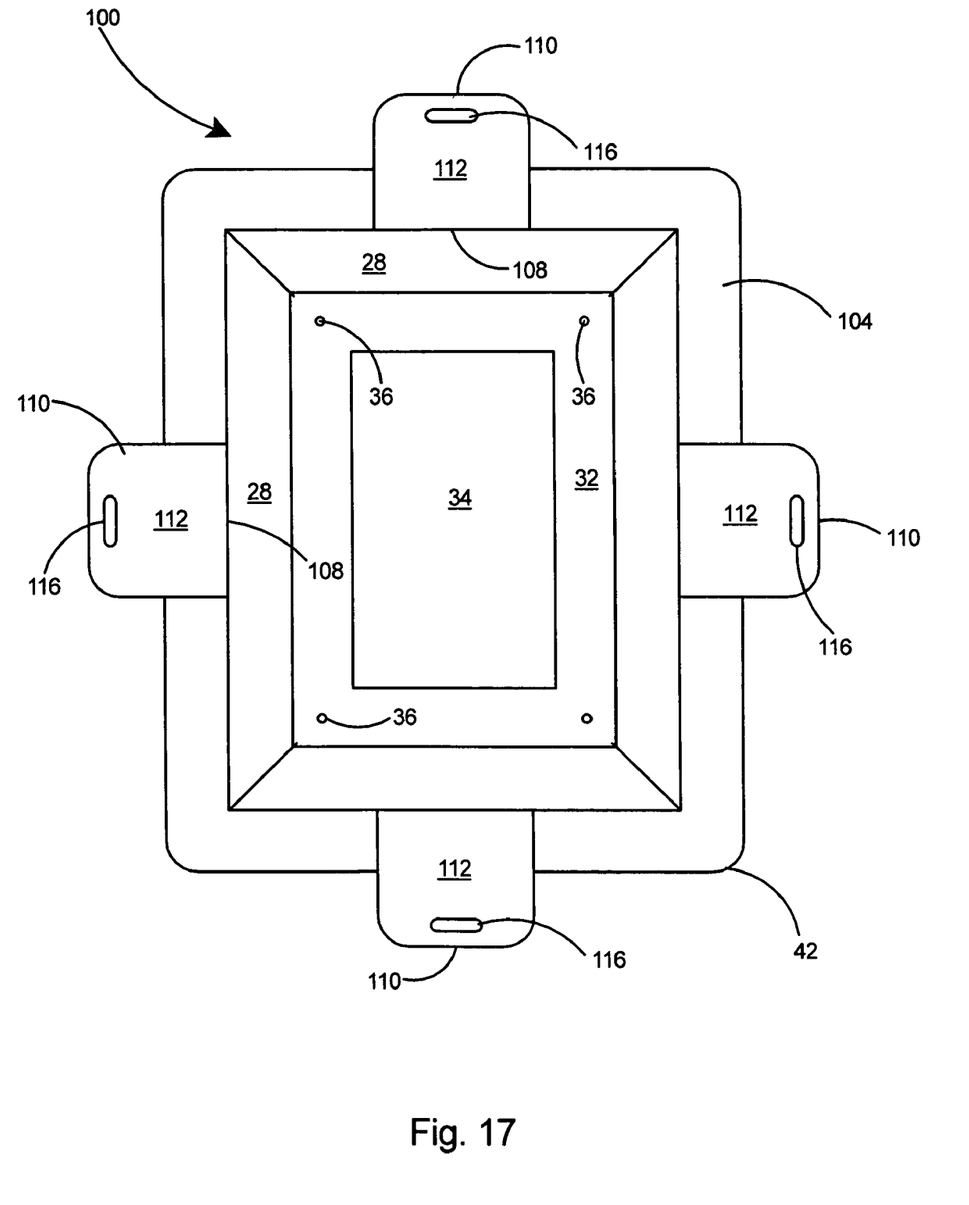
FIG. 17 is a rear view of the frame member of FIG. 14.

With reference to FIGS. 15 and 16, the frame member 100 includes a front edge 102 on the sidewalls 28, a second flange 104 extending outward from the front edge 102, and an outer wall 106 extending rearward from the front edge 102 at a 90 degree angle from the second flange 104 and terminating in a rear edge 108. A peripheral flange 109 including four arms 110 extend outward from the rear edge 108 of the outer wall 106. The back side 112 of the arms 110 are planar with the rear end 44 of the sidewalls 28. A channel 114 extends along the outer wall 106 between the arms 110 and the second flange 104. The arms 110 each include a slot 116 therein.

Figure 18:
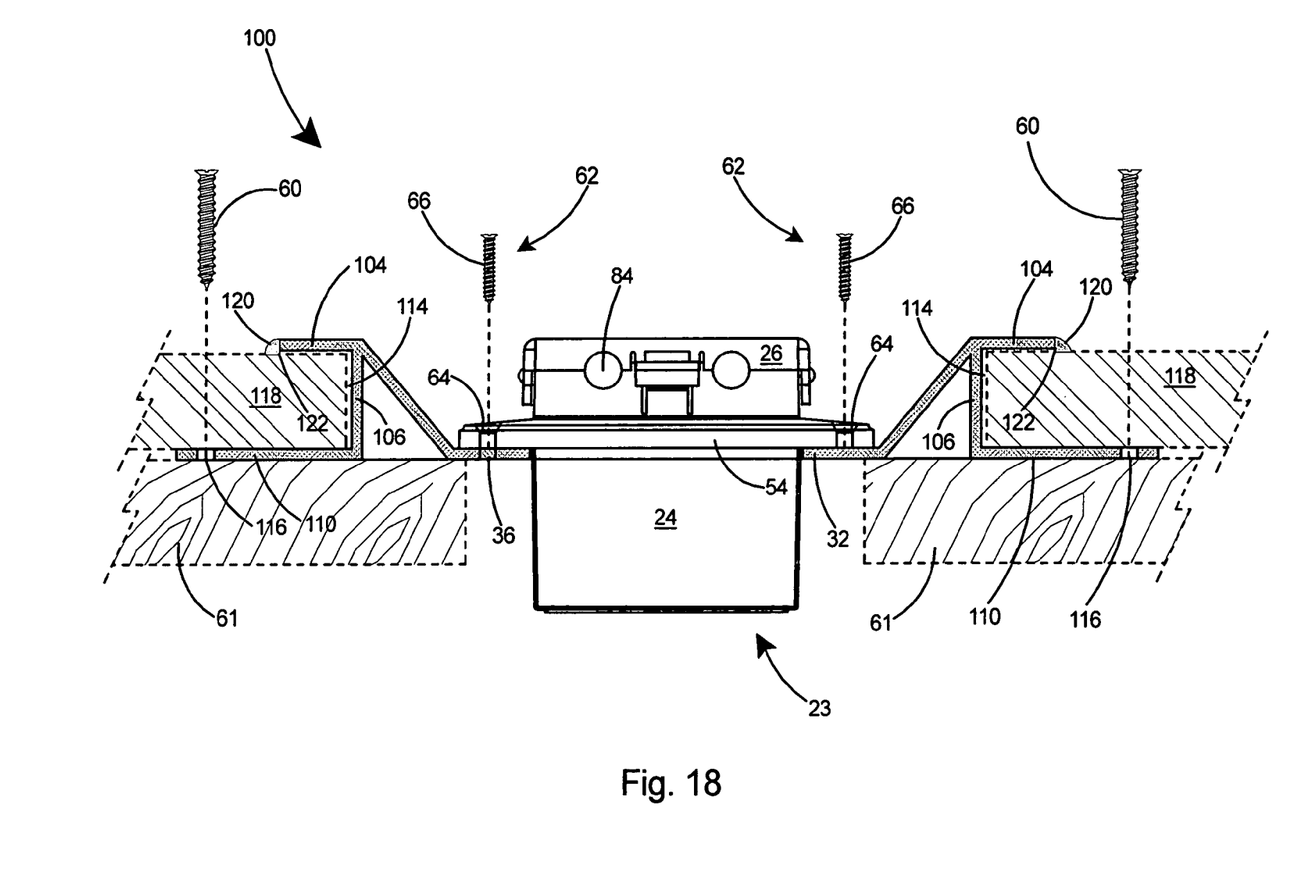
FIG. 18 is a top view of a covered electrical box in alignment with the second embodiment of the frame member to which it will be secured to form the electrical box mounting assembly of the present invention.

Referring to FIG. 18, the outlet box assembly 23 is shown in alignment with the central opening 34 and flush against the panel 32 of the second embodiment of the frame member 100. The frame member 100 is secured to a substrate 61 with fasteners 60 as shown. The fastening arrangement 62 includes apertures 36 in the panel 32 of the frame member 100, apertures 64 in the flange 54 of the outlet box assembly 23 and fasteners 66 for securing through the apertures 64 of the outlet box assembly 23 and into the apertures 36 in the panel 32 portion of the frame member 100. By tightening of the fastening arrangement 62, the flange 54 of the outlet box assembly 23 is secured flush against the panel 32 of the frame member 100.

With reference to FIG. 18, after the frame member 100 is secured to the substrate 61 and the outlet box assembly 23 is secured to the frame member 100, siding 118 is installed around the channel 114 and butted up against the outer wall 106. Caulk 120 can be added at the edge 122 of the second flange 104 and the siding 118 to seal the outlet box assembly against moisture penetration.

Having thus described the invention with reference to a preferred embodiment, it is to be understood that the invention is not so limited by the description herein but is defined as follows by the appended claims.

What is claimed is:

1. An electrical box mounting assembly comprising:
   a frame member including sidewalls having a front edge, a rear end, and an outward extending peripheral flange;
   a panel extending inward from said rear end of said sidewalls of said frame member, said panel including an opening therein;
   an outlet box including peripheral sidewalls and a flange extending outwardly from said peripheral sidewalls;
   said outlet box including a front sidewall portion extending forward from said flange of said outlet box;
   a hinged cover on said front sidewall portion of said outlet box, said cover including a closed configuration and an open configuration;
   said outlet box and said hinged cover forming an outlet box assembly;
   a fastening arrangement for securing said outlet box assembly to said frame member; and
   said panel of said frame member providing a mounting surface for said flange of said outlet box thereby recessing said cover in said closed configuration and said front sidewall portion of said outlet box behind said front edge of said frame member.

2. The electrical box mounting assembly of claim 1 including
   a first sidewall portion extending forward from said peripheral flange of said frame member to said front edge of said frame member; and
   a second sidewall portion extending rearward from said peripheral flange of said frame member to said rear end of said frame member.

3. The electrical box mounting assembly of claim 1 wherein said outlet box includes a rear sidewall portion extending rearward from said flange of said outlet box.

4. The electrical box mounting assembly of claim 3 wherein said fastening arrangement includes
   apertures in said panel of said frame member;
   apertures in said flange of said outlet box; and
   fasteners for securing through said apertures of said outlet box assembly and into said apertures of said frame member,
   whereby said flange of said outlet box is secured flush against said panel of said frame member.

5. The electrical box mounting assembly of claim 1 wherein said peripheral flange of said frame member includes openings therein.

6. The electrical box mounting assembly of claim 5 wherein said openings in said peripheral flange of said frame member promote adherence of stucco to said flange.

7. The electrical box mounting assembly of claim 1 including
   slots in said peripheral flange of said frame member; and
   said slots for receipt of fasteners for securing said frame member to a wall.

8. The electrical box mounting assembly of claim 7 wherein
   said peripheral flange of said frame member includes four corners, and
   each of said corners includes one of said slots.

9. The electrical box mounting assembly of claim 1 wherein said front sidewall portion of said outlet box includes a front edge and first U-shaped slots extending inward from said front edge.

10. The electrical box mounting assembly of claim 9 wherein said cover includes
   a peripheral wall;
   an edge on said peripheral wall; and
   second U-shaped slots extending inward from said edge of said peripheral wall of said cover.

11. The electrical box mounting assembly of claim 10 wherein said cover in said closed configuration includes circular cord openings formed by said first U-shaped slots of said outlet box assembly in alignment with said second U-shaped slots of said cover.

12. The electrical box mounting assembly of claim 1 wherein
   said outlet box includes posts;
   said cover includes apertures therein; and
   said cover is hinged to said outlet box by said posts extending through said apertures in said cover.

13. The electrical box mounting assembly of claim 1 wherein said peripheral flange of said frame member includes outward extending arms.

14. The electrical box mounting assembly of claim 13 including
   an outer wall extending rearward from said front edge of said frame member;
   a second flange extending outward from said front edge of said frame member; and
   a channel extending along said outer wall between said arms and said second flange.

* * * * *